(12) United States Patent
Wang

(10) Patent No.: US 12,339,838 B2
(45) Date of Patent: Jun. 24, 2025

(54) METHOD AND APPARATUS FOR INTELLIGENT VOICE QUERY

(71) Applicant: SoundHound, Inc., Santa Clara, CA (US)

(72) Inventor: Chong Wang, Shenzhen (CN)

(73) Assignee: SoundHound AI IP, LLC., Santa Clara, CA (US)

( * ) Notice: Subject to any disclaimer, the term of this patent is extended or adjusted under 35 U.S.C. 154(b) by 261 days.

(21) Appl. No.: 17/654,635

(22) Filed: Mar. 14, 2022

(65) Prior Publication Data

US 2023/0237056 A1 Jul. 27, 2023

(30) Foreign Application Priority Data

Jan. 27, 2022 (CN) .......................... 202210102621.5

(51) Int. Cl.
*G06F 16/2452* (2019.01)
*G06F 16/242* (2019.01)
*G10L 15/18* (2013.01)
*G10L 15/22* (2006.01)

(52) U.S. Cl.
CPC .... *G06F 16/24522* (2019.01); *G06F 16/2425* (2019.01); *G10L 15/18* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 11,520,815 B1* | 12/2022 | Gutta | G06F 40/30 |
| 2012/0239519 A1* | 9/2012 | Wu | G06Q 30/06 |
| | | | 705/26.61 |
| 2014/0040162 A1* | 2/2014 | McConnell | G06Q 30/0269 |
| | | | 705/347 |
| 2017/0228372 A1* | 8/2017 | Moreno | G06F 16/24522 |
| 2018/0095962 A1* | 4/2018 | Anderson | G06F 16/2365 |
| 2018/0096058 A1* | 4/2018 | Anderson | G06F 16/35 |
| 2019/0147880 A1* | 5/2019 | Booker | G06F 3/167 |
| | | | 704/251 |
| 2019/0362252 A1* | 11/2019 | Miller | G06N 5/04 |
| 2020/0152194 A1* | 5/2020 | Jeong | G10L 13/08 |
| 2021/0019309 A1* | 1/2021 | Yadav | G06F 16/2428 |
| 2023/0111618 A1* | 4/2023 | Sharifi | G10L 15/18 |
| | | | 704/235 |

\* cited by examiner

*Primary Examiner* — Jesse S Pullias
(74) *Attorney, Agent, or Firm* — Platinum Intellectual Property PC

(57) ABSTRACT

A method and an apparatus for processing an intelligent voice query. A voice query input is received from a user. Automatic speech recognition and natural language understanding generate structured query data. It is modified based on an input adaptation rule to obtain modified structured query data appropriate for a content providing server, which provides a query result output corresponding to the modified structured query data. Input adaptation rules may comprise rule sets based on behavior patterns of the user and/or business recommendations. The query result output can be used for natural language generation, which may have similar adaptation rules for output.

21 Claims, 5 Drawing Sheets

METHOD AND APPARATUS FOR INTELLIGENT VOICE QUERY

CROSS-REFERENCE TO RELATED APPLICATION

This application is a Non-provisional application under 35 USC § 111(a), which claims priority to Chinese Patent Application Serial No. 202210102621.5, filed on Jan. 27, 2022, the disclosure of all of which is hereby incorporated by reference in its entirety.

TECHNICAL FIELD

Embodiments described herein generally relate to voice assistants, and more specifically to a method, an apparatus and a system for handling an intelligent voice query.

BACKGROUND

Speech recognition and natural language understanding systems have become prevalent in today's society. More and more everyday devices, such as appliances, vehicles, mobile devices, etc., are being equipped with speech recognition and natural language understanding capabilities. For example, an intelligent voice assistant may be installed on these devices to recognize voice query inputs received from a user and provide corresponding query result outputs. Generally, the intelligent voice assistant may not have the capability of providing content itself but provides query results for the user's voice query with the aid of a content provider. Specifically, when the intelligent voice assistant receives a voice query input from a user, the intelligent voice assistant performs speech recognition and natural language understanding processing on the voice query input to generate structured query data and then outputs the structured query data to the content provider. The content provider performs searching operations or other requested actions and returns a query result to the intelligent voice assistant. The query result is then fed back to the user.

Based on this content query method, the query result obtained by the user is basically controlled by the content provider. That is to say, the user's experience when making a voice query through the intelligent voice assistant is mainly determined by the way that the content provider may provide and push information. The functions of the intelligent voice assistant are mainly for speech recognition and natural language processing, so the impact of the intelligent voice assistant on the user's experience is very limited.

In fact, in the voice query process, the intelligent voice assistant is an apparatus that directly interacts with the user, so enhancing the impact of the intelligent voice assistant on the user's experience is beneficial for providing the user with more direct intelligent services during the voice query process.

SUMMARY

According to an aspect of the present disclosure, an apparatus for realizing an intelligent voice query is provided. The apparatus includes an interface circuit for receiving a voice query input from a user; and a processor coupled to the interface circuit and configured to: perform automatic speech recognition and natural language understanding processing on the voice query input to generate structured query data; modify the structured query data based on an input adaptation rule to obtain modified structured query data; output the modified structured query data to a content providing server; and receive a query result output corresponding to the modified structured query data from the content providing server.

According to another aspect of the present disclosure, a method for performing an intelligent voice query is provided. The method includes: performing automatic speech recognition and natural language understanding processing on a voice query input from a user to generate structured query data; modifying the structured query data based on an input adaptation rule to obtain modified structured query data; outputting the modified structured query data to a content providing server; and receiving a query result output corresponding to the modified structured query data from the content providing server.

According to another aspect of the present disclosure, a non-transitory computer-readable medium having code stored thereon is provided, in which the code, when executed by a processor, cause the processor to implement the above method for achieving an intelligent voice query.

BRIEF DESCRIPTION OF THE DRAWINGS

The specific features, aspects, and advantages of the present invention will become better understood with regard to the following description and accompanying drawings where.

DETAILED DESCRIPTION

Figure 1:
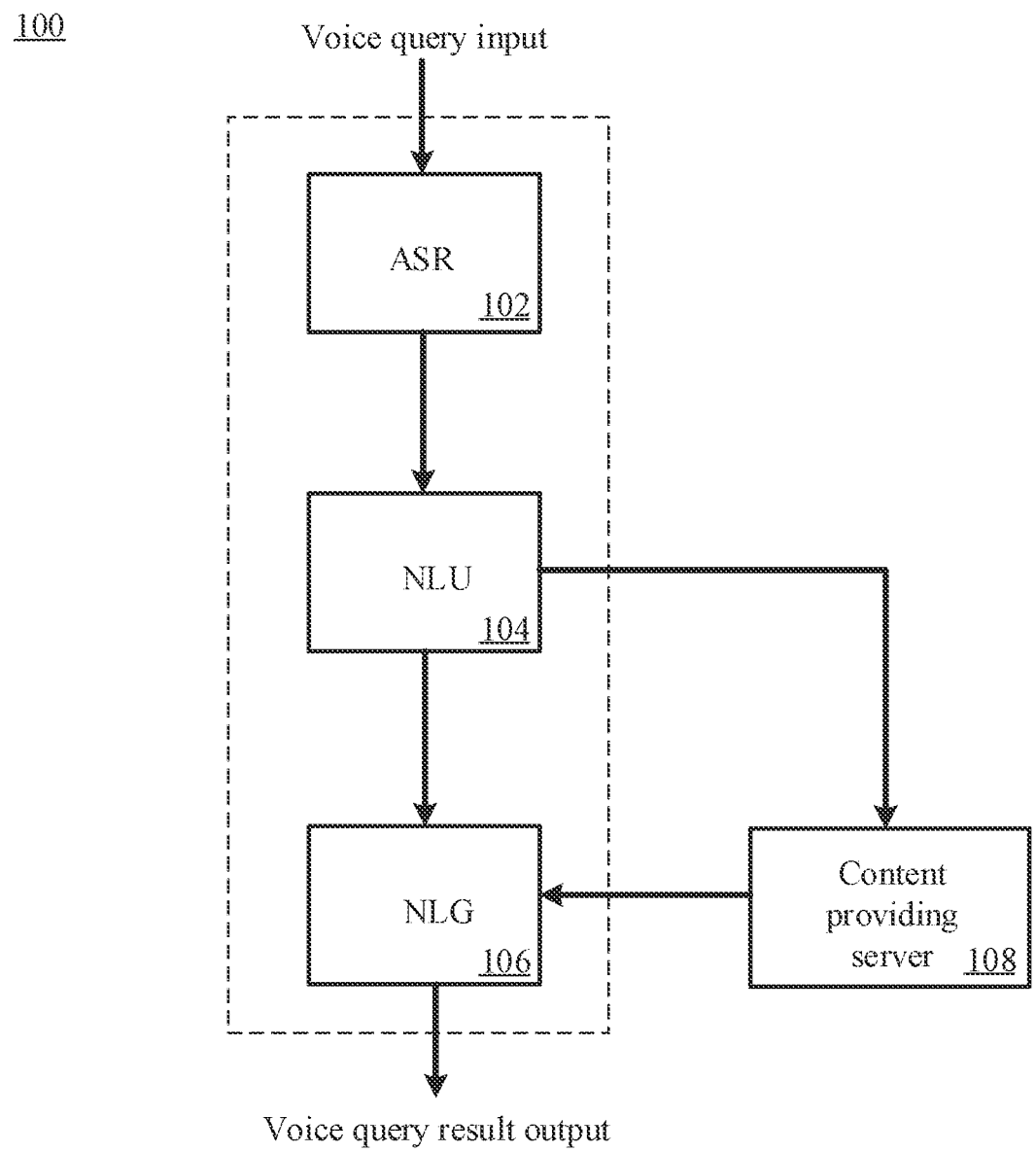
FIG. 1 illustrates a block diagram of a general architecture of a voice query system including a speech recognition and natural language understanding system and a content providing server according to some embodiments of the present disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly herein. The phrase generally does not refer to the same embodiments; however, it may. The terms "comprising," "having," and "including" are synonymous, unless the context dictates otherwise. The phrases "A or B" and "A/B" mean "(A), (B), or (A and B)."

Intelligent voice assistants are increasingly installed on devices (such as appliances, vehicles, mobile devices, etc.) to provide intelligent voice query services. In the present disclosure, the proposed technical solution is described by taking an intelligent voice assistant installed on a vehicle as an example, but it should be understood that the technical solution described in the present disclosure can be easily applied to intelligent voice assistants installed on other devices.

Typically, the intelligent voice assistant relies on a content provider to provide a query result for a user's voice query. Based on this content query method, the query result obtained by the user is basically controlled by the content provider. That is to say, the user's experience when making a voice query through the intelligent voice assistant is mainly determined by the way that the content provider provides and pushes information. For example, when the user issues a voice query "please tell me restaurants within 5 miles" to the intelligent voice assistant installed in the vehicle, the voice query will be provided to a content provider (e.g., Yelp) associated with the vehicle after speech recognition and natural language understanding by the intelligent voice assistant. Then the content provider will provide the user with a list of restaurants within 5 miles recommended by the content provider according to rules of content searching, filtering, sorting, output and the like that are internally set by the content provider. Therefore, restaurant names, types of restaurants, ordering of restaurants or additional advertisements in the restaurant list obtained by the user through the voice query are all determined by the content provider such as Yelp. In this case, the intelligent voice assistant only performs speech recognition and natural language understanding, but does not participate in the specific query process, so the voice assistant has basically no control over the query result output provided by the content provider to the user.

In devices equipped with the intelligent voice assistant, the intelligent voice assistant is an apparatus that directly interacts with the user. A voice request made by the user is first received and understood by the intelligent voice assistant, so it is very suitable for learning and inferring a behavior pattern of the user in the intelligent voice assistant. The behavior pattern of the user may also be referred to as the user's profile herein, which may indicate the user's preferences in daily life or some personalized behaviors, etc. That is to say, the intelligent voice assistant may be one of apparatuses that understand the user's behavior pattern best. Therefore, enhancing the impact of the intelligent voice assistant on the user's query experience is beneficial for providing the user with more direct intelligent services during the voice query process. An intelligent voice assistant can accomplish this by, when receiving a voice query input from the user, modifying the voice query according to a preset input adaptation rule and then provide modified query data to the content provider so as to provide more intelligent voice query services.

FIG. 1 illustrates a block diagram of a general architecture of a voice query system 100 including a speech recognition and natural language understanding system and a content providing server according to some embodiments of the present disclosure. As shown in FIG. 1, the voice query system 100 may include an automatic speech recognition (ASR) processor 102, a natural language understanding (NLU) parsing server 104, a natural language generation (NLG) processor 106 and a content providing server 108. The ASR processor 102, the NLU parsing server 104 and the NLG processor 106 may constitute the speech recognition and natural language understanding system. The intelligent voice assistant may realize the functions of ASR, NLU and NLG by interacting with the speech recognition and natural language understanding system.

In various embodiments, ASR, NLU, and NLG functions may be performed by a single processor chip or a combination of more than one processor, such as a mobile device application processor and a cloud server processor. The ASR, NLU, and NLG functions may be performed on the same processor or any combination of multiple processors in a single device or connected over a network. Communication between processors can include passing transcriptions from ASR 102 to NLU 104 as text or another format, and passing structured data from NLU 104 to NLG 106 using a schema and a format such as Extensible Markup Language (XML) or Javascript Object Notation (JSON).

For example, the ASR processor 102 may convert a received speech audio (e.g., a voice query "restaurants near Santa Clara") into a text string called the transcription (e.g., the transcription "restaurants near Santa Clara"). The NLU parsing server 104 may then perform a natural language understanding process on the transcription to extract the user's intent from the transcription "restaurants near Santa Clara" so as to generate structured query data capable of expressing the user's intent and output the structured query data to the content providing server 108 to request query results from the content providing server 108. The query results provided by the content providing server 108 may be further processed by the NLG processor 106 to generate a voice query result output for feedback to the user. For example, for the transcription "restaurant near Santa Clara", the NLU parsing server 104 may generate the following structured query data and provide the structured query data to the content providing server 108 (e.g., Groupon).

```
"GrouponData": {
    "Tags": {
        "Deselect": { },
        "Select": [
            {
                "Category": "Location",
                "CategoryTrans": "Near the business district"
                "SubCategory": "Santa Clara",
                "SubCategoryTrans": "Santa Clara",
                "lat": "39.910987",
                "lng": "116.411337"
            }
        ]
    },
    "response": "Search restaurants near Santa Clara for you."
}
```

According to some embodiments of the present disclosure, when the user issues the voice query input to the intelligent voice assistant, the ASR processor 102 and the NLU parsing server 104 may perform speech recognition and natural language understanding processing on the voice query input to generate structured query data. The structured query data may be modified based on an input adaptation rule, and then the modified structured query data may be output to the content providing server. The content providing server may generate the query result output based on the modified structured query data and according to internally set rules of content searching, filtering, sorting, output and the like. The query result output may be presented to the user in textual form, or the query result output may be provided to the NLG processor 106, and the NLG processor 106 may generate a voice query result output for feedback to the user.

According to some embodiments of the present disclosure, the input adaptation rule may include a rule set based on learning and inference of the user's behavior pattern. For example, when the intelligent voice assistant receives the voice query input "please tell me restaurants within 5 miles" from the user, the intelligent voice assistant may not directly convert the voice query input "please tell me restaurants within 5 miles" into the structured query data understandable by the content providing server and provide the structured query data to the content providing server. Instead, after performing the speech recognition and natural language understanding of the voice query input "please tell me restaurants within 5 miles", the intelligent voice assistant may modify the structured query data according to the learned and inferred behavior pattern of the user, and then provide the modified structured query data to the content providing server to obtain a query result output that is more in line with the daily behavior pattern of the user. For example, when the intelligent voice assistant infers that the user does not eat spicy food and the daily consumption level is less than 20 dollars per meal based on the learning of the user's behavior pattern, the intelligent voice assistant may modify the structured query data by adding the constraints of "no spicy food" and "cost less than 20 dollars" to obtain the modified structured query data. Thus, when the modified structured query data is provided to the content providing server, the content providing server will return a list of restaurants within 5 miles that offer light dishes and cost less than 20 dollars per person.

In these embodiments, the intelligent voice assistant may modify the voice query input according to the rule set based on learning and inference of the user's behavior pattern, so that the query result output returned by the content providing server to the user may be more in line with the user's daily behavior pattern and thus more personalized query services may be provided to the user.

In addition, in order to provide personalized query services more accurately, the intelligent voice assistant may have a voice dialogue with the user according to the learned and inferred behavior pattern of the user when receiving the voice query input from the user so as to further confirm specific needs of the user, and then modify the structured query data based on the specific needs confirmed by the user. For example, when receiving the user's voice query input "please tell me restaurants within 5 miles", the intelligent voice assistant may ask the user "no spicy food, right?" and "do you want to keep the cost under 20 dollars?", and then modify the structured query data after getting confirmation from the user.

In addition, the intelligent voice assistant may also choose to offer recommendations that the user may be interested in according to the user's behavior pattern. For example, when the user issues a voice query "how is the current weather in New York?" to the intelligent voice assistant, the intelligent voice assistant may modify the voice query to provide additional information according to the user's behavior pattern. For example, if the intelligent voice assistant learns that the user often pays attention to the weather and is willing to receive additional information, the intelligent voice assistant may generate an additional query "how is the weather in New York in the next 7 days?", and then provide the user's original voice query "how is the current weather in New York?" together with the additional query "how is the weather in New York in the next 7 days?" to the content providing server. In this way, the user will not only receive information about the current weather conditions in New York within a few hours but will also receive information about the weather conditions in New York in the next seven days. Conversely, if the intelligent voice assistant learns that the user often refuses to receive additional information, the intelligent voice assistant may not modify the user's original voice query "how is the current weather in New York?", or the intelligent voice assistant may modify the user's original voice query "how is the current weather in New York?" to a more specific query "how is the weather in New York today from 3:00 μm to 5:00 pm?" according to the current time (e.g. about 3:00 pm).

According to some embodiments of the present disclosure, the input adaptation rule may further include a rule set based on business recommendations associated with the voice query input. In an example, the intelligent voice assistant receives the voice query input "nearby cafes" from the user, and the intelligent voice assistant knows that the user often goes to Starbucks cafes and Luckin cafes according to the user's daily behavior pattern. In the case that Starbucks cafes have more commercial cooperation with the provider of the intelligent voice assistant or the manufacturer of the vehicle equipped with the intelligent voice assistant, the intelligent voice assistant may modify the structured query data by adding the constraint of "Starbucks cafes are preferred" to generate the modified structured query data. Thus, when the modified structured query data is provided to the content providing server, the content providing server may return a list of nearby cafes, in which Starbucks cafes will be ranked at the top.

In another example, when the intelligent voice assistant frequently receives the voice query input "Score of Chicago Bulls" from the user, the intelligent voice assistant may infer that the user may be a fan of the Chicago Bulls. Therefore, when the intelligent voice assistant receives the voice query input "Score of Chicago Bulls" from the user, the intelligent voice assistant may modify the structured query data by adding the constraint of "Chicago Bulls uniform recommendation" to generate the modified structured query data. Thus, when the modified structured query data is provided to the content providing server, the content providing server may return not only the score of the Chicago Bulls, but also a list of product recommendations for the Chicago Bulls uniforms.

It should be noted that in the above examples, when modifying the structured query data according to the rule set based on business recommendations associated with the voice query input, the intelligent voice assistant also needs to take into account the user's daily behavior pattern and the user's feedback to the pushed information to avoid making recommendations that the user is not interested in and affecting the user's experience.

According to some embodiments of the present disclosure, the input adaptation rules may further include a rule for adapting the voice query input of the user into structured query data understandable by the content providing server. For example, the voice query input from the user may be complex, unclear, or incomplete. In this case, after performing speech recognition and natural language understanding processing on the voice query input, the intelligent voice assistant may adapt the voice query input into the structured query data understandable by the content providing server according to the intelligent voice assistant's understanding of the voice query input and the learned daily behavior pattern of the user.

In an example, the user issues a voice query "please tell me restaurants within 5 miles, except French and Japanese, still open now" to the intelligent voice assistant. Such a voice query input includes a negative expression ("except French and Japanese") that is hard to understand and an unclear expression ("still open now"). If the voice query input is directly converted into structured query data and provided to the content providing server, the content providing server may output a recommendation list that does not meet the user's requirements because the content providing server cannot understand the user's requirements correctly. In this case, based on powerful speech recognition and natural language understanding capabilities combined with the learning and inference of the user's behavior pattern, the intelligent voice assistant can adapt the above complex and unclear voice query input into the structured query data that is easily understood by the content providing server, such as the structured query data corresponding to the query "American, Chinese or Korean restaurants within 5 miles and opening hours from 11:00 to 22:00".

Based on the above description, the present disclosure proposes that the voice query input can be modified based on various possible input adaptation rules in the intelligent voice assistant to provide more intelligent query services and further improve the user's experience. According to some embodiments of the present disclosure, modifications to the voice query input may occur after the intelligent voice assistant performs speech recognition and natural language understanding on the voice query input and may be implemented in the NLU parsing server 104 as shown in FIG. 1. In this case, for example, a dynamic database storing various input adaptation rules may be built in the NLU parsing server 104.

Figure 2:
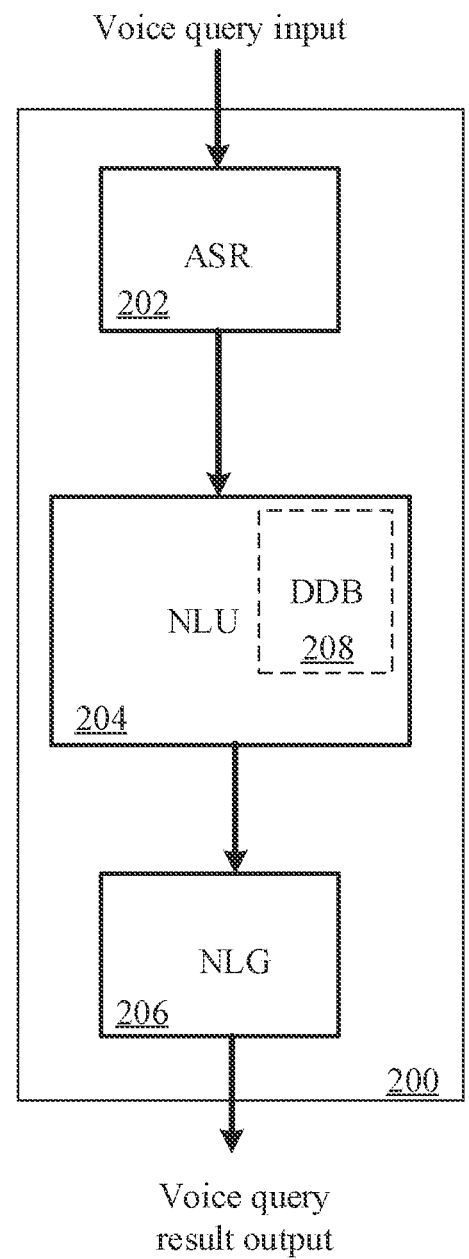
FIG. 2 illustrates a schematic structural block diagram of an apparatus for processing intelligent voice query according to some embodiments of the present disclosure.

FIG. 2 illustrates a schematic structural block diagram of an apparatus 200 for executing intelligent voice query according to some embodiments of the present disclosure. The apparatus 200 may include an ASR processor 202, an NLU parsing server 204, and an NLG processor 206. A dynamic database (DDB) 208 may be built in the NLU parsing server 204, or the DDB 208 may be provided separately from the NLU parsing server 204 and the NLU parsing server 204 may access the dynamic database 208 over a network. Specifically, in the dynamic database, data related to the user's behavior pattern and query data modification rule set based on the user's behavior pattern can be generated and dynamically updated based on learning and inference of the user's behavior pattern; business recommendation rules can be generated and dynamically updated based on information of merchants who have established business cooperation with the provider of the intelligent voice assistant or the manufacturer of the vehicles equipped with the intelligent voice assistant; and various input adaptation rules associated with adaptation of the voice query input can be stored and dynamically updated.

According to some embodiments of the present application, the input adaptation rule may include a rule set based on learning and inference of the user's behavior pattern. For example, for the user's voice query input "restaurants near Santa Clara", according to the learned behavior pattern of the user, the intelligent voice assistant knows that the user often chooses a restaurant with cost per person of 10 to 20 dollars, so the input adaptation rule may be to add a query filter tag about the price range on the basis of the original query input of the user. Based on the input adaptation rule, the intelligent voice assistant may modify the original voice query input "restaurants near Santa Clara" to "restaurants near Santa Clara with cost per person of 10 to 20 dollars". That is, the query filter tag about the price range can be added to the structured query data corresponding to "restaurants near Santa Clara" to generate the following modified structured query data corresponding to "restaurants near Santa Clara with cost per person of 10 to 20 dollars", in which the italic part is the added query filter tag about the price range.

```
"GrouponData": {
  "Tags": {
    "Deselect": { },
    "Select": [
      {
        "Category": "PRICE",
        "CategoryTrans": "Select price",
        "SubCategory": "Fifty_to_OneHundred",
        "SubCategoryTrans": "50-100"
      },
      {
        "Category": "Location",
        "CategoryTrans": "Near the business district",
        "SubCategory": "Santa Clara",
        "SubCategoryTrans": "Santa Clara",
        "lat": "39.910987",
        "lng": "116.411337"
      }
    ]
  },
  "response": "Search restaurants near Santa Clara with cost per person of 10 to 20 dollars for you."
}
```

According to some embodiments of the present application, the input adaptation rule may include a rule set based on business recommendations associated with the user's voice query input. For example, for the user's voice query input "restaurants near Santa Clara", according to the preset business recommendation rule, the intelligent voice assistant may add a query filter tag about restaurants recommended or not recommended on the basis of the user's original query input. Based on the input adaptation rule, the intelligent voice assistant can modify the original voice query input "restaurants near Santa Clara" to "restaurants near Santa Clara, except Grandma's House" (Grandma's House being the name of a restaurant). That is, the query filter tag about restaurants recommended or not recommended can be added to the structured query data to generate the modified structured query data as follows, in which the italic part is the added query filter tag about content not recommended.

```
"GrouponData": {
  "Tags": {
    "Deselect": [
      {
        "Category": "Brand",
        "CategoryTrans": "Brand",
        "SubCategory": "Grandma's House",
        "SubCategoryTrans": "Grandma's House"
      }
    ],
    "Select": [
      {
        "Category": "Location",
        "CategoryTrans": "Near the business district",
        "SubCategory": "Santa Clara",
        "SubCategoryTrans": "Santa Clara",
```

```
        "lat": "39.910987",
        "lng": "116.411337"
      }
    ]
  },
  "response": "Search restaurants near Santa Clara for you,
   except Grandma's House."
}
```

In addition, it should be noted that the input adaptation rule can be set by considering various factors at the same time, as required. According to some embodiments, the input adaptation rule may be set by considering both of the user's behavior pattern and the business recommendation. For example, for the user's voice query input "restaurants near Santa Clara", according to the learned behavior pattern of the user and the preset business recommendation rule, the intelligent voice assistant can add both a query filter tag about the price range and a query filter tag about restaurants recommended or not recommended on the basis of the user's original query input. Based on the input adaptation rule, the intelligent voice assistant can modify the original voice query input "restaurants near Santa Clara" to "restaurants near Santa Clara with cost per person of 10 to 20 dollars, except Grandma's House". That is, both the query filter tag about the price range and the query filter tag about restaurants recommended or not recommended can be added to the structured query data to generate the modified structured query data as follows, in which the italic part is the added query filter tag about content not recommended and the added query filter tag about the price range.

```
"GrouponData": {
  "Tags": {
    "Deselect": [
      {
        "Category": "Brand",
        "CategoryTrans": "Brand",
        "SubCategory": "Grandma's House",
        "SubCategoryTrans": "Grandma's House"
      }
    ],
    "Select": [
      {
        "Category": "PRICE",
        "CategoryTrans": "Select price",
        "SubCategory": "Fifty_to_OneHundred",
        "SubCategoryTrans": "50-100"
      },
      {
        "Category": "Location",
        "CategoryTrans": "Near the business district",
        "SubCategory": "Santa Clara",
        "SubCategoryTrans": "Santa Clara",
        "lat": "39.910987",
        "lng": "116.411337"
      }
    ]
  },
  "response": "Search restaurants near Santa Clarawith cost per
   person of 10 to 20 dollars for you, except Grandma's House."
}
```

As mentioned above, relevant query filters can be set according to consideration factors such as the user's daily behavior pattern, the business recommendation rule, and the like, and then these query filters may be matched and combined by a suitable algorithm to generate suitable input adaptation rules. These input adaptation rules may be stored in the dynamic database and may be dynamically updated as needed. Note that the specific algorithm for matching and combining the query filters to generate the input adaptation rules can be selected according to actual needs and technological development, which is not limited in the present disclosure.

After performing natural language understanding on the voice query input from the user to generate the structured query data, the NLU parsing server 204 may match the understood voice query input with various rule data stored in the dynamic database 208 to obtain an appropriate input adaptation rule, then modify the structured query data based on the obtained input adaptation rule, and output the modified structured query data to the content providing server. Note that the modification of the structured query data mentioned in the present disclosure may include any reasonable modification methods such as rewriting the structured query data, replacing the structured query data, or deleting or adding structured query data.

According to some embodiments of the present disclosure, in addition to modifying the voice query input by use of the input adaptation rule on the input side to provide more intelligent voice query services, the voice query result output can be modified by use of an output adaptation rule on the output side, so as to further improve the user's experience.

As shown in FIG. 2, when the intelligent voice assistant receives the query result output from the content providing server, the NLG processor 206 can perform natural language generation processing on the query result output to generate a voice query result output for feedback to the user. Usually, the intelligent voice assistant may directly provide the voice query result generated by the natural language generation processing to the user. However, in order to provide more intelligent voice query services, the intelligent voice assistant can modify the voice query result output based on the output adaptation rule, and then provide the modified voice query result output to the user.

Similar to the input adaptation rule, the output adaptation rule may include a rule set based on learning and inference of the user's behavior pattern, a rule set based on business recommendations associated with the voice query result output, and the like. For example, the intelligent voice assistant can filter or sort the voice query result output according to the user's behavior pattern to output a query result that is more in line with the user's daily behavior pattern; or the intelligent voice assistant can filter or sort the voice query result output according to the needs of business recommendations and meanwhile considering the user's daily behavior pattern, so as to output a query result that meets both the needs of business recommendations and the user's daily behavior pattern. As for the examples of the output adaptation rule, reference may be made to the above discussion of similar examples of the input adaptation rule, which will not be described in detail here. Also, similarly, the output adaptation rule may be stored in the dynamic database, which may be built into the NLG processor 206 or accessed by the NLG processor 206 over a network.

In addition, as the intelligent voice assistant modifies the voice query input on the input side, the query result output provided by the content providing server based on the modified structured query data may not match the user's original voice query input. For example, the user's original voice query input is "please tell me nearby cafes", and the intelligent voice assistant modifies the query to "please tell me nearby Starbucks cafes" according to the needs of business recommendations and the user's daily behavior pattern. In this case, the query result output provided by the content providing server may be "Nearby Starbucks cafes are" followed by a list of nearby Starbucks cafes. In order to keep the query result output fed back to the user consistent with the user's original voice query input, the NLG processor 206 may modify the generated voice query result output based on the voice query input to generate a voice query result output matching the voice query input. For example, the NLG processor 206 may modify the voice query result output to be "Nearby cafes are" followed by a list of nearby Starbucks cafes. In this way, an output adaptation rule set may be coordinated with an input adaptation rule set in a reverse manner.

According to some embodiments of the present disclosure, the intelligent voice assistant may provide the voice query input to two or more content providing servers, obtain two or more query result outputs accordingly, and then integrate these query result outputs based on a preset output integration rule to generate an integrated query result output as the query result output for feedback to the user.

Figure 3:
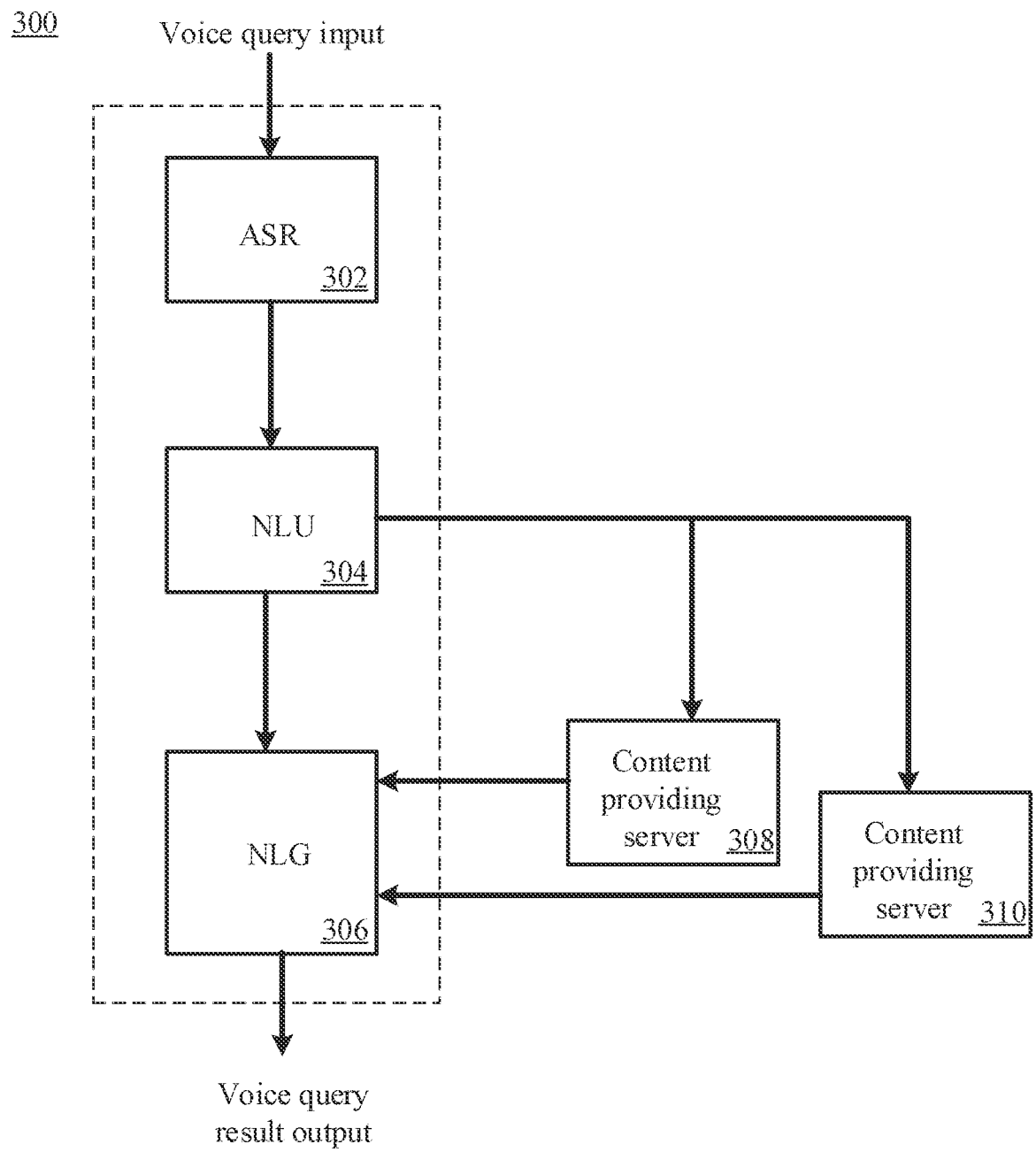
FIG. 3 illustrates a block diagram of a general architecture of a voice query system including a speech recognition and natural language understanding system and a content providing server according to some embodiments of the present disclosure.

FIG. 3 illustrates a block diagram of a general architecture of a voice query system 300 including a speech recognition and natural language understanding system and a content providing server according to some embodiments of the present disclosure. As shown in FIG. 3, the NLU parsing server 304 performs natural language understanding processing on a transcription from the ASR processor 302 to generate structured query data, and outputs the structured query data to two content providing servers 308 and 310. The structured query data may be structured query data modified based on the input adaptation rule described in the above embodiments. The content providing servers 308 and 310 are coupled to the NLG processor 306 and provide the first query result output and the second query result output to the NLG processor 306, respectively. In the NLG processor 306, the first query result output and the second query result output may be integrated based on a preset output integration rule to generate an integrated query result output. The NLG processor 306 may then perform natural language generation processing on the integrated query result output to generate a voice query result output for feedback to the user.

Similar to the input adaptation rule and the output adaptation rule, the output integration rule may include a rule set based on learning and inference of the user's behavior pattern, a rule set based on business recommendations associated with the query result output, and the like. For example, the intelligent voice assistant can filter or sort the overall output of the first query result output and the second query result output according to the user's behavior pattern to output a query result that is more in line with the user's daily behavior pattern; or the intelligent voice assistant can filter or sort the overall output of the first query result output and the second query result output according to the needs of business recommendations and meanwhile considering the user's daily behavior pattern, so as to output a query result that meets both the needs of business recommendations and the user's daily behavior pattern. As for the examples of the output integration rule, reference may be made to the above discussion of similar examples of the input adaptation rule, which will not be described in detail here. Also, similarly, the output integration rule may be stored in the dynamic database, which may be built into the NLG processor 306 or accessed by the NLG processor 306 over a network.

In general, the present disclosure proposes to modify the voice query input based on the preset input adaptation rule in the intelligent voice assistant to provide more intelligent query services and further improve the user's experience. In addition, some embodiments of the present disclosure propose to modify the voice query result output based on the preset output adaptation rule and integrate the query result outputs from multiple content providing servers based on the preset output integration rule, thereby further optimizing the voice query service.

Figure 4:
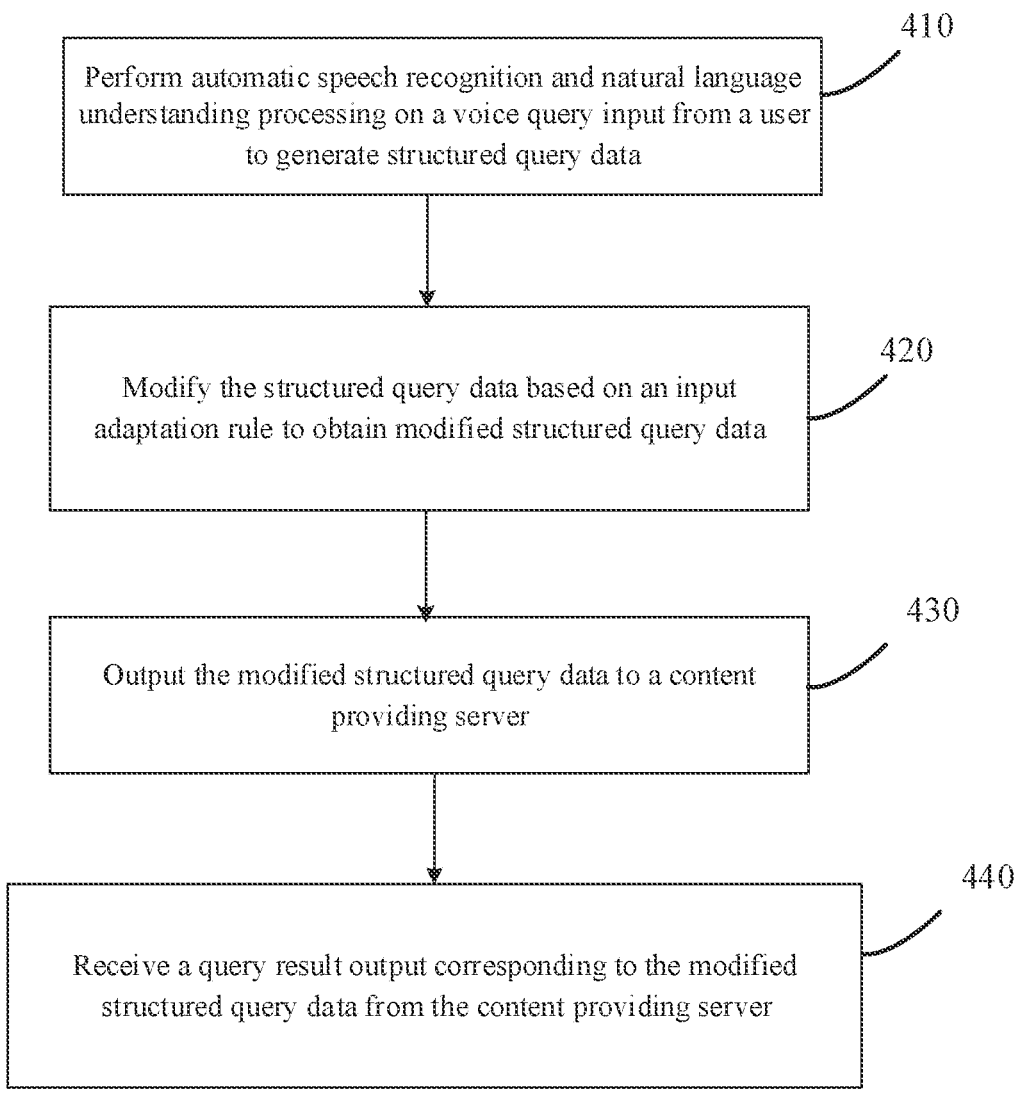
FIG. 4 illustrates a flowchart of a method for processing intelligent voice query according to some embodiments of the present disclosure.

FIG. 4 illustrates a flowchart of a method 400 for processing an intelligent voice query according to some embodiments of the present disclosure. The method 400 may be implemented by the intelligent voice assistant and include operations 410 to 440.

At operation 410, the intelligent voice assistant may perform automatic speech recognition and natural language understanding processing on a voice query input from a user to generate a structured query data.

At operation 420, the intelligent voice assistant may modify the structured query data based on an input adaptation rule to obtain modified structured query data.

In some embodiments, the input adaptation rule may include a rule set based on learning and inference of a behavior pattern of the user.

In some embodiments, the input adaptation rule may include a rule set based on business recommendations associated with the voice query input.

In some embodiments, the input adaptation rule may include a rule for adapting the voice query input of the user into structured query data understandable by the content providing server.

At operation 430, the intelligent voice assistant may output the modified structured query data to a content providing server.

At operation 440, the intelligent voice assistant may receive a query result output corresponding to the modified structured query data from the content providing server.

In some embodiments, the above content providing server may be referred to as a first content providing server, and the query result output received from the first content providing server may be referred to as a first query result output, and the above method 400 may further include: outputting the modified structured query data to a second content providing server; receiving a second query result output corresponding to the modified structured query data from the second content providing server; and integrating the first query result output and the second query result output based on an output integration rule to generate an integrated query result output as the query result output.

In some embodiments, the output integration rule may include a rule set based on learning and inference of a behavior pattern of the user.

In some embodiments, the output integration rule may include a rule set based on business recommendations associated with the query result output.

In some embodiments, the above method may further include: performing natural language generation processing on the query result output to generate a voice query result output for feedback to the user.

In some embodiments, the above method may further include: modifying the voice query result output based on the voice query input to generate a voice query result output that matches the voice query input.

In some embodiments, the above method may further include: modifying the voice query result output based on an output adaptation rule before the voice query result output is fed back to the user.

In some embodiments, the output adaptation rule comprises a rule set based on learning and inference of a behavior pattern of the user.

In some embodiments, the output adaptation rule comprises a rule set based on business recommendations associated with the voice query result output.

Figure 5:
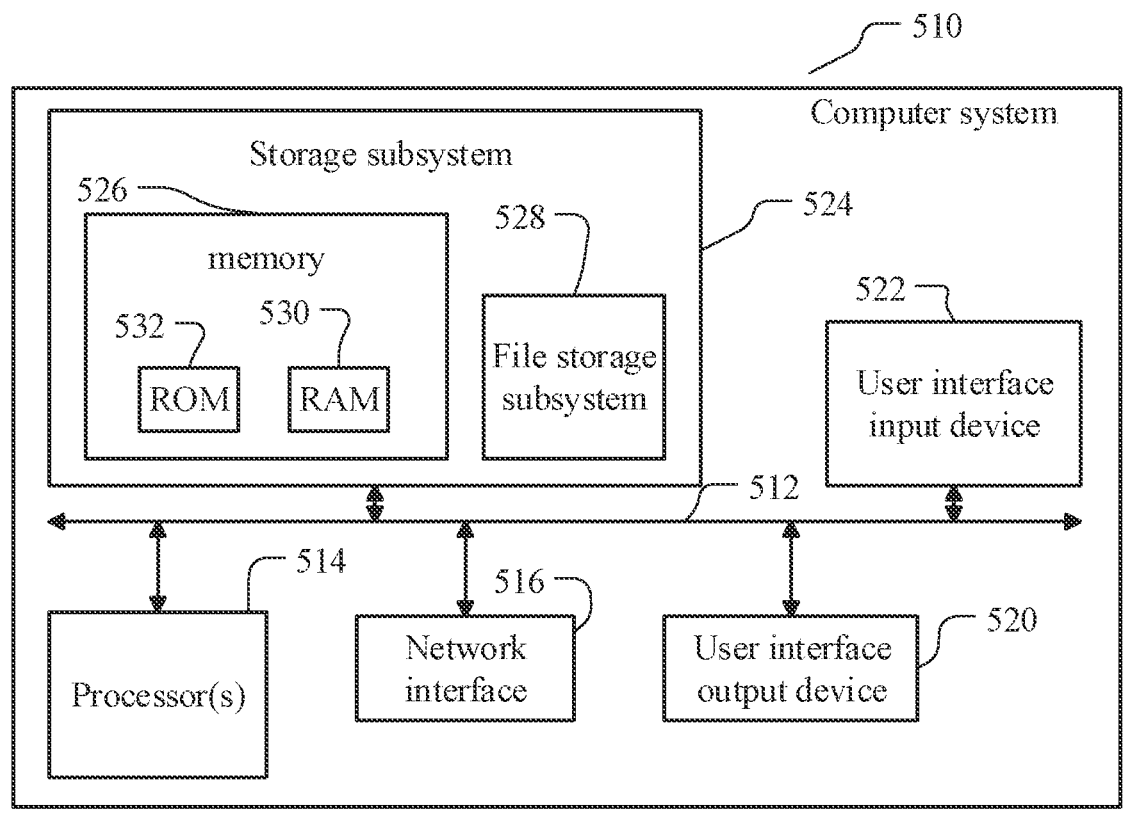
FIG. 5 illustrates a block diagram of an example computer system of various components for implementing an intelligent voice query method.

FIG. 5 is a block diagram of an example computer system that can implement the method 400 of FIG. 4. The computer system 510 typically includes at least one processor 514, which communicates with a number of peripheral devices via bus subsystem 512. These peripheral devices may include a storage subsystem 524, comprising for example memory devices and a file storage subsystem, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as speech recognition systems, microphones, and other types of input devices. In general, use of the term "input device" is intended to include all possible types of devices and ways to input information into computer system 510 or onto a communication network. The user interface input device 522 may function as an interface circuit in the present application for receiving a voice query input from the user and providing the received voice query input to the processor 514, so that the processor 514 may implement the intelligent voice query method according to the embodiments of the present application.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the operations described herein. These operations may be implemented by software that is generally executed by processor 514 alone or in combination with other processors.

Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The software implementing the functionality of certain embodiments may be stored by file storage subsystem 528 in the storage subsystem 524, or in other machines accessible by the processor.

Bus subsystem 512 provides a mechanism for letting the various components and subsystems of computer system 510 communicate with each other as intended. Although bus subsystem 512 is shown schematically as a single bus, alternative embodiments of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating the various embodiments. Many other configurations of computer system 510 are possible having more or fewer components than the computer system depicted in FIG. 5.

Various embodiments for generating edited transcriptions in an ASR-NLU system have been described in the disclosure. The technology disclosed can be practiced as a method, apparatus or article of manufacture (a non-transitory computer readable medium having code stored thereon). An apparatus implementation of the disclosed technology includes one or more processors coupled to memory. The memory is loaded with computer instructions that perform various operations. An article of manufacture implementation of the disclosed technology includes a non-transitory computer readable medium (CRM) storing code that, if executed by one or more computers, would cause the one or more computers to perform various operations. The apparatus implementation and the CRM implementation are capable of performing any of the method implementations described below.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed is:

1. An apparatus for processing an intelligent voice query, the apparatus comprising:
    an interface circuit that receives a voice query input; and
    a processor coupled to the interface circuit and configured to:
    perform automatic speech recognition and natural language understanding processing on the voice query input to generate original structured query data;
    receive historical user behavior pattern data;
    receive dynamic business recommendation data associated with business partner preferences, wherein the dynamic business recommendation data is regularly updated based on real-time data of a user;
    generate an input adaptation rule based on the historical user behavior pattern data and the dynamic business recommendation data, wherein the input adaptation rule narrows parameter ranges of the original structured query data;
    determine, based on the input adaptation rule, whether further clarifications of the voice query input are needed;
    conduct a voice dialogue with the user to confirm the further clarifications of the voice query input;
    modify the original structured query data based on the voice dialogue and the input adaptation rule to obtain modified structured query data with reduced data ranges than the original structured query data;

update the input adaptation rule based on learning and inference from the voice query input and the voice dialogue to generate an updated input adaptation rule;

output the modified structured query data to a content providing server; and receive a query result output corresponding to the modified structured query data from the content providing server.

2. The apparatus of claim 1, wherein the content providing server is a first content providing server, the query result output received from the first content providing server is a first query result output, and the processor is further configured to:

output second modified structured query data to a second content providing server;

receive a second query result output corresponding to the modified structured query data from the second content providing server; and integrate the first query result output and the second query result output based on an output integration rule to generate an integrated query result output as the query result output.

3. The apparatus of claim 2, wherein the output integration rule comprises a rule set based on learning and inference of a behavior pattern.

4. The apparatus of claim 2, wherein the output integration rule comprises a rule set based on business recommendations associated with the query result output.

5. The apparatus of claim 1, wherein the processor is further configured to:

perform natural language generation processing on the query result output to generate a voice query result output.

6. The apparatus of claim 5, wherein the processor is further configured to:

modify the voice query result output based on the structured query data to generate a voice query result output that corresponds to the voice query input.

7. The apparatus of claim 5, wherein the processor is further configured to:

modify the voice query result output based on an output adaptation rule.

8. The apparatus of claim 7, wherein the output adaptation rule comprises a rule set based on learning and inference of a behavior pattern.

9. The apparatus of claim 7, wherein the output adaptation rule comprises a rule set based on business recommendations associated with the voice query result output.

10. The apparatus of claim 1, wherein the processor is further configured to:

supplement the modified structured query data with additional information based on the historical user behavior pattern data.

11. The apparatus of claim 1, wherein the input adaptation rule further comprises a rule set based on both business recommendations associated with the voice query input and the historical user behavior pattern data.

12. A method for processing an intelligent voice query, the method comprising:

performing automatic speech recognition and natural language understanding processing on a voice query input to generate original structured query data;

receiving historical user behavior pattern data;

receiving dynamic business recommendation data associated with business partner preferences, wherein the dynamic business recommendation data is regularly updated based on real-time location data of a user;

generating an input adaptation rule based on the historical user behavior pattern data and the dynamic business recommendation data, wherein the input adaptation rule narrows parameter ranges of the original structured query data;

determining, based on the input adaptation rule, whether further clarifications of the voice query input are needed;

conducting a voice dialogue with the user, to confirm the further clarifications of the voice query input;

modifying the original structured query data based on the voice dialogue and the input adaptation rule to obtain modified structured query data with reduced data ranges than the original structured query data;

updating the input adaptation rule based on learning and inference from the voice query input and the voice dialogue to generate an updated input adaptation rule;

outputting the modified structured query data to a content providing server; and receiving a query result output corresponding to the modified structured query data from the content providing server.

13. The method of claim 12, wherein the content providing server is a first content providing server, the query result output received from the first content providing server is a first query result output, and the method further comprises:

outputting second modified structured query data to a second content providing server;

receiving a second query result output corresponding to the modified structured query data from the second content providing server; and integrating the first query result output and the second query result output based on an output integration rule to generate an integrated query result output as the query result output.

14. The method of claim 13, wherein the output integration rule comprises a rule set based on learning and inference of a behavior pattern.

15. The method of claim 13, wherein the output integration rule comprises a rule set based on business recommendations associated with the query result output.

16. The method of claim 12, further comprising:

performing natural language generation processing on the query result output to generate a voice query result output.

17. The method of claim 16, further comprising:

modifying the voice query result output based on the structured query data to generate a voice query result output that corresponds to the voice query input.

18. The method of claim 16, further comprising:

modifying the voice query result output based on an output adaptation rule.

19. The method of claim 18, wherein the output adaptation rule comprises a rule set based on learning and inference of a behavior pattern.

20. The method of claim 18, wherein the output adaptation rule comprises a rule set based on business recommendations associated with the voice query result output.

21. A non-transitory computer-readable medium having code stored thereon, wherein the code, when executed by a processor, cause the processor to implement a method for processing intelligent voice query, the method comprising:

performing automatic speech recognition and natural language understanding processing on a voice query input to generate original structured query data;

receiving historical user behavior pattern data;

receiving dynamic business recommendation data associated with business partner preferences, wherein the dynamic business recommendation data is regularly updated based on real-time data of a user;

generating an input adaptation rule based on the historical user behavior pattern data and the dynamic business recommendation data, wherein the input adaptation rule narrows parameter ranges of the original structured query data;

determining, based on the input adaptation rule, whether further clarifications of the voice query input are needed;

conducting a voice dialogue with the user to confirm the further clarifications of the voice query input;

modifying the original structured query data based on the voice dialogue and the input adaptation rule to obtain modified structured query data with reduced data ranges than the original structured query data;

updating the input adaptation rule based on learning and inference from the voice query input and the voice dialogue to generate generated an updated input adaptation rule;

outputting the modified structured query data to a content providing server; and receiving a query result output corresponding to the modified structured query data from the content providing server.

* * * * *